US010826076B1

(12) United States Patent
Macauley et al.

(10) Patent No.: US 10,826,076 B1
(45) Date of Patent: Nov. 3, 2020

(54) PATTERNED ELECTRODE CATALYST

(71) Applicants: Natalia Macauley, Los Alamos, NM (US); Siddharth Komini Babu, Santa Fe, NM (US); Rangachary Mukundan, Los Alamos, NM (US); Mahlon S. Wilson, Los Alamos, NM (US); Rodney L. Borup, Los Alamos, NM (US); Stephen Grot, New Castle, DE (US)

(72) Inventors: Natalia Macauley, Los Alamos, NM (US); Siddharth Komini Babu, Santa Fe, NM (US); Rangachary Mukundan, Los Alamos, NM (US); Mahlon S. Wilson, Los Alamos, NM (US); Rodney L. Borup, Los Alamos, NM (US); Stephen Grot, New Castle, DE (US)

(73) Assignee: Triad National Security, LLC, Los Alamos, NM (US)

( * ) Notice: Subject to any disclaimer, the term of this patent is extended or adjusted under 35 U.S.C. 154(b) by 72 days.

(21) Appl. No.: 16/057,485

(22) Filed: Aug. 7, 2018

Related U.S. Application Data

(60) Provisional application No. 62/542,485, filed on Aug. 8, 2017.

(51) Int. Cl.
*H01M 4/92* (2006.01)
*H01M 4/86* (2006.01)
(Continued)

(52) U.S. Cl.
CPC ......... *H01M 4/926* (2013.01); *H01M 4/8663* (2013.01); *H01M 4/8807* (2013.01); *H01M 8/1004* (2013.01)

(58) Field of Classification Search
None
See application file for complete search history.

(56) References Cited

U.S. PATENT DOCUMENTS 6,500,217 B1 * 12/2002 Starz ................ B41M 1/26
29/623.5
2003/0157397 A1 * 8/2003 Barton ............... H01M 8/0239
429/481

(Continued)

OTHER PUBLICATIONS

Macauley et al., "Performance of Stratified Fuel Cell Catalyst Layer," Los Alamos National Laboratory, Poster presented Aug. 8, 2016, at Gordon Fuel Cell Conference, 1 page.
(Continued)

*Primary Examiner* — Daniel S Gatewood
(74) *Attorney, Agent, or Firm* — Klarquist Sparkman, LLP

(57) ABSTRACT

Disclosed herein are embodiments of a patterned electrode comprising regions of catalyst and segregating regions that separate the regions of catalyst. The segregating regions may be regions of non-catalytic material. The catalyst regions may correspond to the channels of a flow field. The electrode provides improved fuel cell performance, particularly at high current densities. The electrode may be for all suitable applications, such as in a membrane electrode assembly and/or a fuel cell. Also disclosed is a method for making the patterned electrode. The method may comprise using masks to apply the catalyst and non-catalyst material to a substrate.

20 Claims, 12 Drawing Sheets

(51) Int. Cl.
*H01M 8/1004* (2016.01)
*H01M 4/88* (2006.01)

(56) References Cited

U.S. PATENT DOCUMENTS

2010/0304269 A1* 12/2010 Kim .................... H01M 4/8626
                                                           429/483
2012/0321995 A1* 12/2012 Roof .................... H01M 4/881
                                                           429/523

OTHER PUBLICATIONS

Macauley et al., "Performance of Stratified Fuel Cell Catalyst Layer," Presented Oct. 7, 2016, at James Smith Seminar/Los Alamos National Laboratory, 19 pages.
Macauley et al., "Fuel Cell Catalyst Layer," Presented Oct. 4, 2017, at Conference of the Electrochemical Society, 3 pages.
Springer et al., "Modeling and Experimental Diagnostics in Polymer Electrolyte Fuel Cells," *Journal of the Electrochemical Society*, 140(12):3513-3527, Dec. 1993.

* cited by examiner

| | XRF Loading (mg/cm²) | ECSA Desorption Peak 30°C, 100 % RH & 10.5 psig (m²/g) | Mass Activity 0.9V 80°C, 100 % RH & 10.5 psig in H₂ – O₂ (A/mg_Pt) |
|---|---|---|---|
| Baseline | 0.1130 | 67 | 0.428 |
| Lands Only | 0.0620 | 76 | 0.405 |
| Lands + 1/2 C | 0.0648 | 62 | 0.386 |
| Channels Only | 0.0698 | 46 | 0.469 |
| Lands Only #2 | 0.1100 | 76 | 0.505 |

PATTERNED ELECTRODE CATALYST

CROSS REFERENCE TO RELATED APPLICATION

This application claims the benefit of the earlier filing date of U.S. provisional patent application No. 62/542,485, filed Aug. 8, 2017, which is incorporated herein by reference in its entirety.

ACKNOWLEDGMENT OF GOVERNMENT SUPPORT

This invention was made with government support under Contract No. DE-AC52-06NA25396 awarded by the U.S. Department of Energy. The government has certain rights in the invention.

FIELD

This disclosure concerns an electrode having a catalyst patterned thereon, and methods for making and using electrodes having the catalyst.

BACKGROUND

Fuel cells are promising devices for clean power generation in a variety of economically and environmentally significant applications. By using hydrogen produced from renewable energy sources, such as solar and wind, fuel cells can provide carbon-neutral power without any pollutants, such as $SO_x$ and $NO_x$. Initial commercialization of clean, high-efficiency fuel cell electric vehicles is already underway, but further technological innovation is needed to improve cost-competitiveness of fuel cells in the marketplace.

Proton exchange membrane (PEM) fuel cells typically utilize Nafion® polymeric materials for membranes. The structure for Nafion® is provided below.

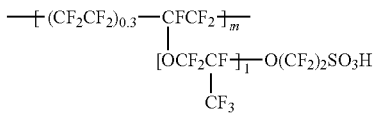

PEM fuel cells that use Nafion® are currently being commercialized in fuel cell vehicles. However, these fuel cells generate water as a byproduct at the cathode. At high current densities the water generated can flood the catalyst, resulting in lower performance. Currently, the cost of the fuel cell is limiting commercialization of PEM Fuel Cells. The cost of the fuel cell is predominantly determined by the cost of the catalyst and membrane electrode assembly (MEA). Catalyst layers with improved performance are needed to reduce the overall cost of the fuel cell.

SUMMARY

Disclosed herein are embodiments of an electrode having a catalyst patterned thereon. The electrode comprises a substrate having a first surface, a first catalyst region and a second catalyst region both comprising catalyst material, and a first segregating region located in between the first and second catalyst regions. The first and second catalyst regions and the first segregating region are all located on the first surface of the substrate. The substrate may be a gas diffusion layer or a membrane. The first and second catalyst regions may not be in direct physical contact with each other. The first region and the second region of catalyst material may have a first width of from greater than zero to at least 2 mm, such as from 0.4 mm to 0.8 mm. And/or the first region of non-catalyst material may have a second width of from greater than zero to 2 mm, such as from 0.3 mm to 1 mm.

The catalyst material may be any catalyst suitable for producing a working electrode for a fuel cell. Certain disclosed exemplary embodiments comprise platinum and a carbon support, and may have a platinum loading of from greater than zero to 0.5 mg/cm$^2$, such as from 0.05 to 0.2 mg/cm$^2$. The carbon support maybe a high surface area carbon support, and may have a surface area of 500 m$^2$/gm to 1,000 m$^2$/gm.

The first segregating region may comprise a non-catalyst material. The non-catalyst material may comprise carbon, such as a high surface area carbon, which may have a surface area of 500 m$^2$/gm to 1,000 m$^2$/gm. And/or the non-catalyst material may comprise an ionomer, such as a perfluorosulfonic acid (PFSA)/polytetrafluoroethylene (PTFE) copolymer. In some embodiments, the non-catalyst material has an ionomer/carbon ratio of from greater than zero to 1, such as from 0.5 to 0.9, and in certain embodiments, the ionomer/carbon ratio is 0.6.

Also disclosed is a membrane electrode assembly comprising a cathode comprising the electrode as disclosed herein, an anode, and a membrane. The assembly may further comprise a flow field comprising a first and second channel and a first wall separating the first and second channel. The first and second catalyst regions patterned on the electrode may be located to correspond to the first and second channels of the flow field. And/or the first segregating region of the electrode may be located to correspond to the first wall of the flow field. The flow field may comprise a plurality of channels and the electrode may comprise a plurality of catalyst regions corresponding to the plurality of channels. And/or the flow field may comprise a plurality of walls and the electrode may comprise a plurality of segregating regions that correspond to the plurality of walls. In some embodiments, the first and second catalyst regions and the first segregating region of the electrode are located to correspond to the first channel of the flow field.

Also disclosed are a fuel cell and a stationary power device, each comprising an electrode as disclosed herein, or a disclosed membrane electrode assembly.

A method for making the electrode is also disclosed. The method may comprise forming on a first surface of a substrate, a first catalyst region comprising catalyst material, a second catalyst material comprising catalyst material, and a first segregating region in between the first and second catalyst regions. Forming the first and second catalyst regions may comprise applying the catalyst material to the substrate, and/or forming the segregating region may comprise applying a non-catalyst material to the substrate. In certain embodiments, the method comprises applying the catalyst material, before applying the non-catalyst material.

The catalyst material may be applied in a pattern selected to correspond to channels of a flow field. And the method may further comprise selecting a first mask that corresponds to the channels of the flow field, and applying the catalyst material to the substrate using the first mask. Additionally, or alternatively, the non-catalyst material may be applied in a pattern selected to correspond to walls of a flow field. And the method may further comprise selecting a second mask that corresponds to the walls of the flow field, and applying the non-catalyst material to the substrate using the second mask.

The catalyst material may be applied using any suitable technique, such as by spraying a catalyst ink onto the substrate. The catalyst ink comprises the catalyst material and a first solvent, which may comprise water and a first alcohol. Additionally, or alternatively, applying the non-catalyst material may comprise spraying a non-catalyst ink onto the substrate. The non-catalyst ink may comprise the non-catalyst material and a second solvent, such as water and a second alcohol. Each of the first and second alcohols, independently, may be a $C_{1-4}$ alcohol, with certain disclosed embodiments using n-propyl alcohol.

The foregoing and other objects, features, and advantages of the invention will become more apparent from the following detailed description, which proceeds with reference to the accompanying figures.

DETAILED DESCRIPTION

I. Definitions

Figure 1:
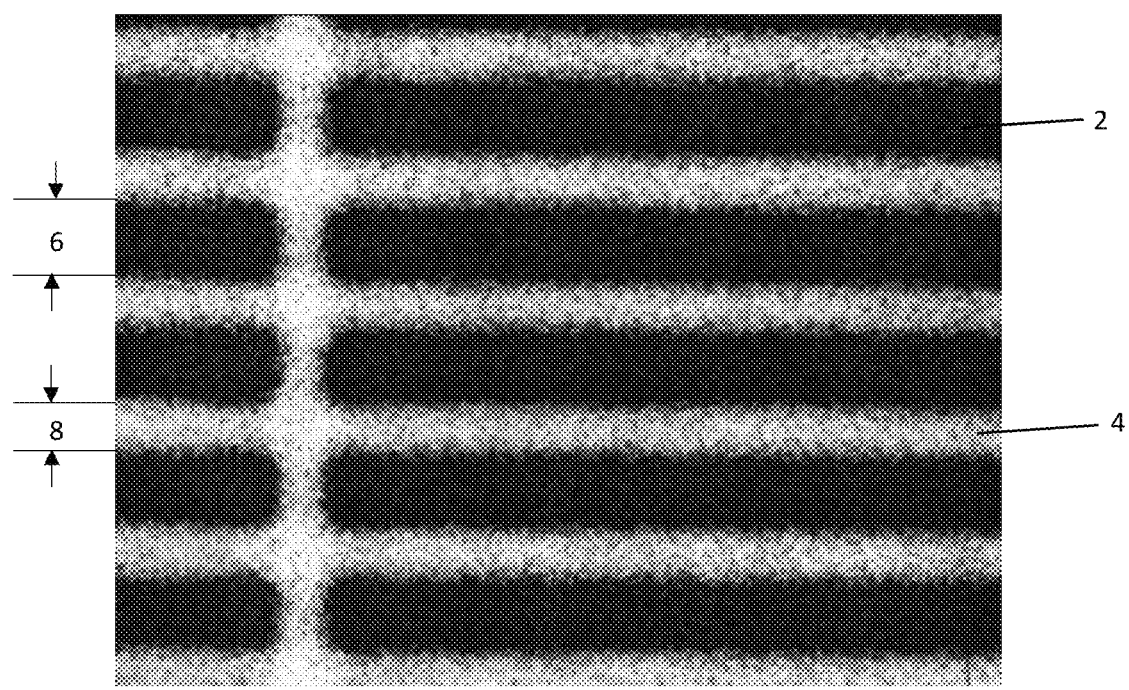
FIG. 1 is a digital image of an exemplary embodiment of an electrode having a catalyst layer patterned thereon.

The following explanations of terms and methods are provided to better describe the present disclosure and to guide those of ordinary skill in the art in the practice of the present disclosure. The singular forms "a," "an," and "the" refer to one or more than one, unless the context clearly dictates otherwise. The term "or" refers to a single element of stated alternative elements or a combination of two or more elements, unless the context clearly indicates otherwise. As used herein, "comprises" means "includes." Thus, "comprising A or B," means "including A, B, or A and B," without excluding additional elements. All references, including patents and patent applications cited herein, are incorporated by reference.

Unless otherwise indicated, all numbers expressing quantities of components, molecular weights, percentages, temperatures, times, etc., as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Unless explained otherwise, all technical and scientific terms used herein have the same meaning as commonly understood by one of ordinary skill in the art to which this disclosure pertains. Although methods and materials similar or equivalent to those described herein can be used in the practice or testing of the present disclosure, suitable methods and materials are described below. The materials, methods, and examples are illustrative only and not intended to be limiting.

"Anode" refers to an electrode through which electric charge flows into a polarized electrical device. From an electrochemical point of view, negatively-charged anions move toward the anode and/or positively-charged cations move away from it to balance the electrons leaving via external circuitry. In a discharging battery or galvanic cell, the anode is the negative terminal where electrons flow out. For proton exchange membrane fuel cells, protons move from the anode to the cathode.

"Cathode" refers to an electrode through which electric charge flows out of a polarized electrical device. From an electrochemical point of view, positively charged cations invariably move toward the cathode and/or negatively charged anions move away from it to balance the electrons arriving from external circuitry. In a discharging battery or galvanic cell, the cathode is the positive terminal, toward the direction of conventional current. This outward charge is carried internally by protons in a proton membrane fuel cell.

"Membrane: refers to a thin, pliable material, sometimes formed as a sheet, of synthetic or natural material. An ion exchange membrane has anionic or cationic groups that permit ions to pass through the membrane. For fuel cells, the current density and operational lifetime of the fuel cell are factors in selecting the ion conductivity for the fuel cell. Some membranes are selective membranes, through which certain ions or molecules with particular characteristics pass more readily than other ions or molecules.

"Lands-only" refers to an electrode where catalyst is applied in a pattern, more generally a selected pattern such as a pattern that corresponds to the walls or "land" regions of a flow field.

"Channels-only" refers to an electrode where catalyst is applied in a pattern that corresponds to the channels of a flow field.

"Baseline MEA" refers to a membrane electrode assembly (MEA) where the electrodes have a substantially continuous catalyst layer, i.e. a non-patterned catalyst layer.

"Patterned electrode" refers to an electrode that comprises catalyst material deposited and/or applied in a pattern rather than a substantially continuous layer ("patterned catalyst" or "patterned catalyst layer"). The pattern may comprise stratified or segregated bands of catalyst, and/or it may comprise one or more substantially continuous bands of catalyst forming a pattern, such as, for example, a spiral. See for example, FIG. 4.

II. Overview

During fuel cell operation at high current densities, the amount of water produced at the cathode catalyst can be sufficient to block active catalyst sites, typically platinum particles, leading to reduced fuel cell efficiency. Disclosed herein is a catalyst structure designed to facilitate water transfer away from the catalysis active sites and therefore enhance fuel cell efficiency at high current densities. Some embodiments concern a catalyst structure comprising areas where catalyst is present and segregating areas where catalyst is absent. Other embodiments concern catalyst structures comprising areas of different amounts of catalyst, such as areas of high catalyst concentration, such as areas that have a thicker layer of catalyst, and areas of low catalyst density, such as areas comprising a lower catalyst thickness. In some embodiments, the different areas are located as different bands, for example, two bands of catalyst material separated by a band of non-catalyst material. The segregating area may comprise uncovered substrate, such as uncovered membrane or gas diffusion layer, or it may comprise a non-catalyst filler material that is applied to the substrate.

As the fuel cell operates, particularly at high current densities, water is produced at the catalyst bands and is transferred to the non-catalyst bands before diffusing away from the catalyst layer. This results in the active catalyst sites being quickly available again to catalyze further reaction in the fuel cell, thereby increasing the fuel cell efficiency.

III. Patterned Electrode

A. Catalyst Bands

Figure 2:
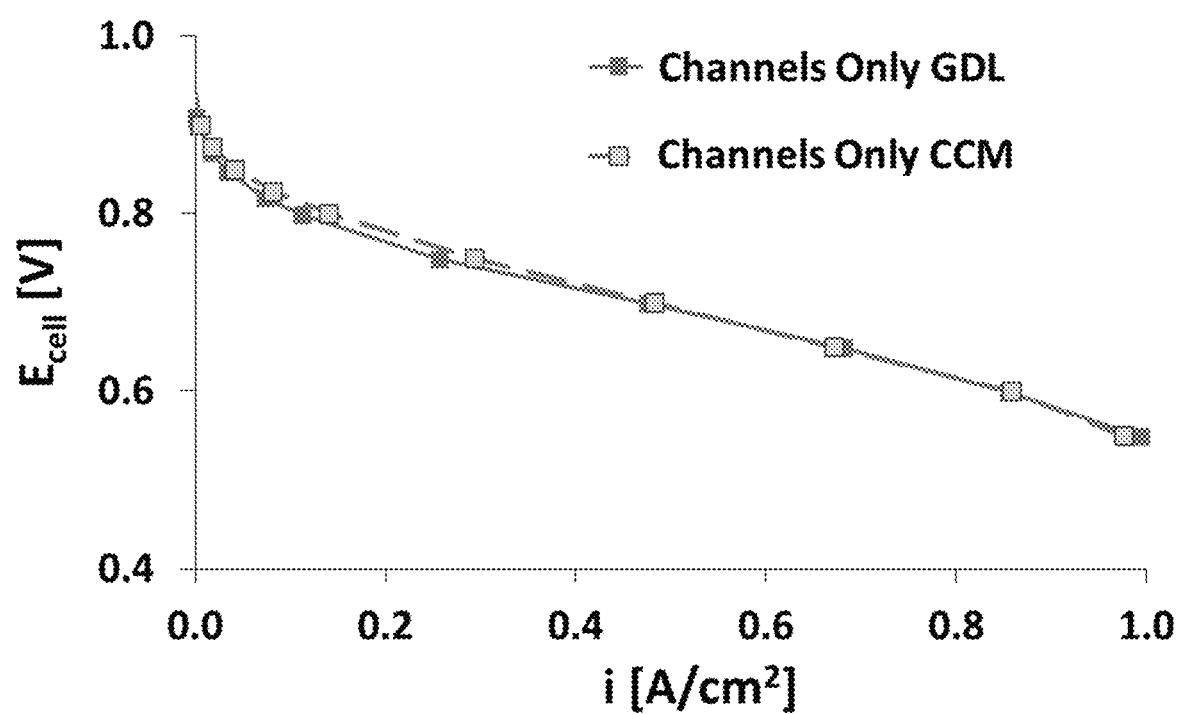
FIG. 2 is a graph of voltage (V) versus current density (A/cm$^2$), illustrating that for channels-only MEAs, the patterned catalyst layer provides similar results regardless of whether the catalyst is applied to a membrane (CCM) or to a gas diffusion layer (GDL)/microporous layer (MPL).
Figure 3:
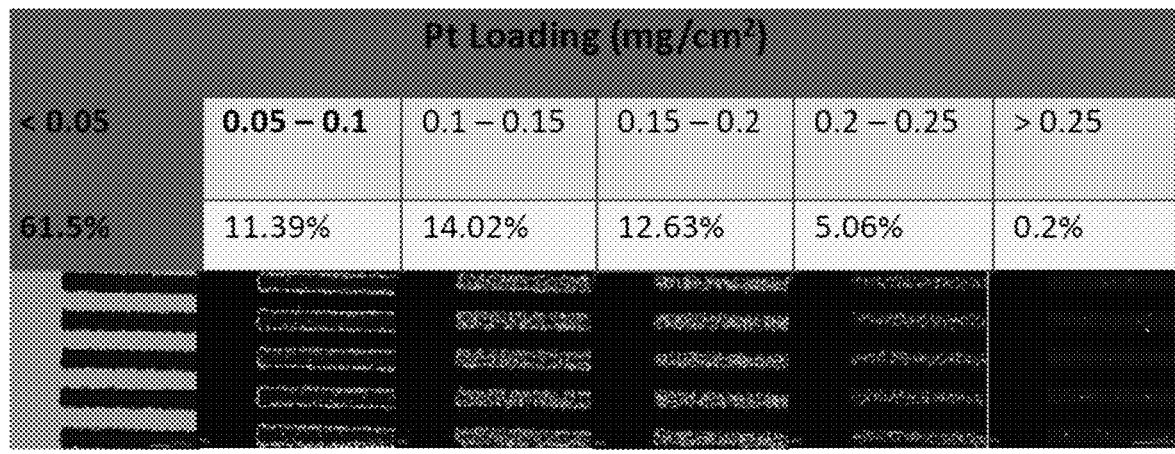
FIG. 3 is a table showing different Pt loadings calculated from Pt intensities during XRF mapping.

Disclosed herein are embodiments of a patterned electrode. In some embodiments, the patterned electrode is used as the cathode in a fuel cell. FIG. 1 shows an exemplary patterned electrode, illustrating the bands of catalyst 2 with uncovered substrate, such as membrane 4, in between each band. The substrate for the patterned electrode may be any substrate suitable to form an electrode, such as a gas diffusion layer (GDL) that forms a gas diffusion electrode (GDE), or a polymer electrolyte membrane that forms a catalyst coated membrane (CCM). The performance of the patterned catalyst layer may be substantially independent of the substrate material (FIG. 2). The width 6 of the catalyst bands 2 may be any width suitable to facilitate catalysis while allowing water to efficiently move away from catalyst active sites to reduce or substantially prevent loss of fuel cell efficiency. In some embodiments, the catalyst band width 6 is from greater than zero to 2 mm or more, such as from 0.1 mm to 1.5 mm, from 0.2 mm to 1 mm, or from 0.4 mm to 0.8 mm. The spacing 8 between the catalyst bands is any size suitable to facilitate water moving away from the catalyst active sites. In some embodiments, the spacing 8 is from greater than zero to 2 mm or more, such as from 0.1 mm to 2 mm, from 0.2 mm to 1.5 mm, from 0.3 mm to 1 mm, or from 0.4 mm to 0.8 mm. In some embodiments, spacing 8 is the same as the catalyst band width 6. The catalyst may be a carbon-supported Pt. The carbon support may be a high, medium, or low surface area carbon. In certain embodiments, a high surface area carbon is used, such as a carbon having a surface area of 500 $m^2$/gm to 1,000 $m^2$/gm or more, typically about 800 $m^2$/gm. The Pt loading can be any loading suitable to sufficiently catalyze the fuel cell. In some embodiments, the loading is from greater than zero to 0.5 $mg/cm^2$ or more, such as from 0.025 to 0.4 $mg/cm^2$, or from 0.05 to 0.2 $mg/cm^2$, and in certain embodiments, the Pt loading was 0.1 $mg/cm^2$. FIG. 3 provides XRF mapping data showing different amounts of Pt loading in the catalyst areas. Loadings were calculated on multiple points of the MEA, compared to a Pt thin film standard, and was correlated to measure Pt intensity.

Figure 4:
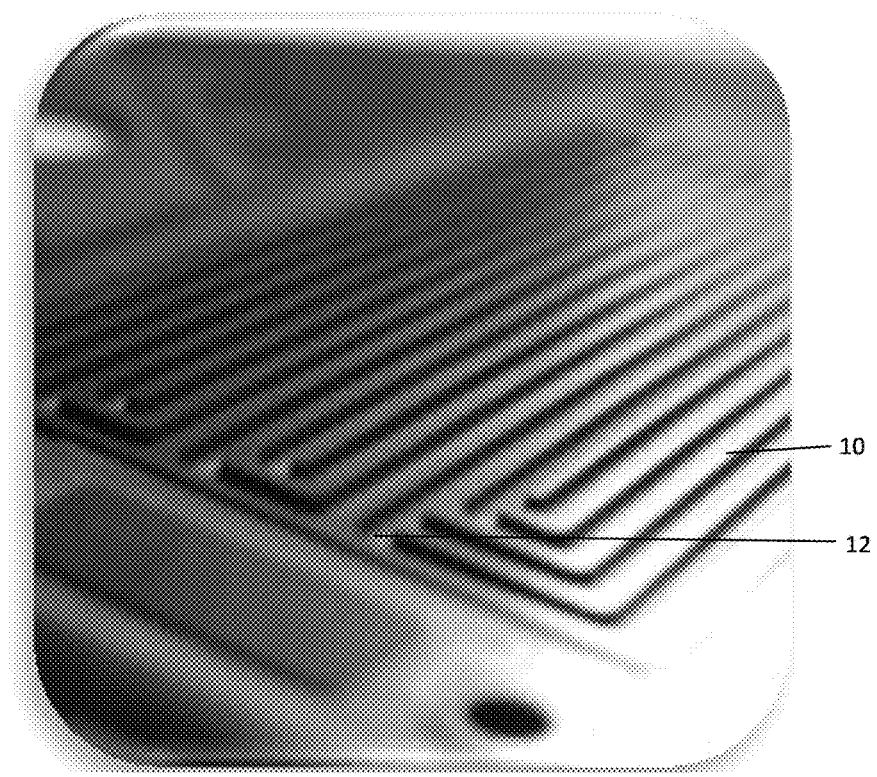
FIG. 4 is a digital image of an exemplary flow field from a fuel cell.
Figure 5:
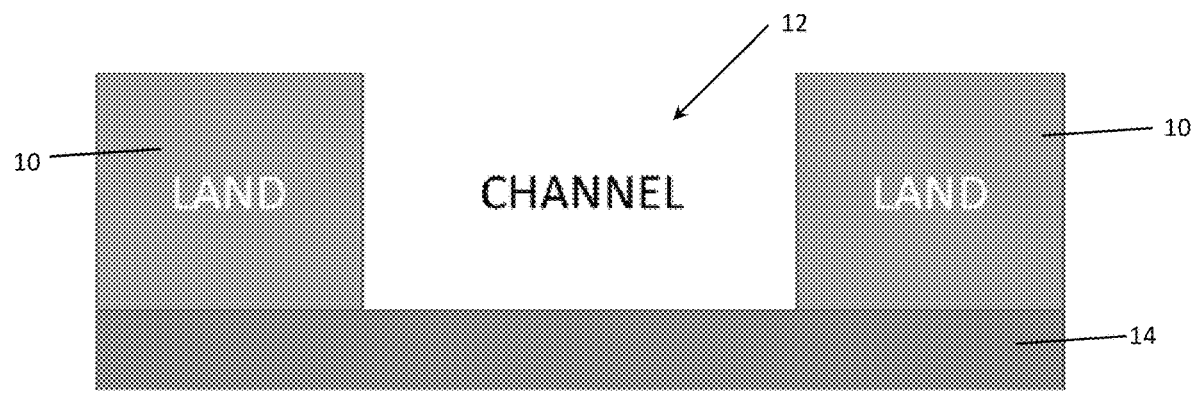
FIG. 5 is a schematic cross sectional diagram of a flow field, illustrating the walls or land portions of the flow field and how they define the channel.

In some embodiments, the stratification or catalyst design on the membrane is selected or designed to match a flow field pattern in a fuel cell. For example, a flow field may comprise channels through which gas flows, where each channel is defined by walls, or "land" areas. FIG. 4 is a digital image of an exemplary flow field, showing the walls 10 and channels 12. FIG. 5 is a schematic diagram of a channel 12 defined by walls 10 and a gas diffusion layer 14.

The patterned catalyst layer can be made by any technique suitable to produce a desired catalyst pattern on a substrate, such as a membrane or GDL. In some embodiments, the catalyst is applied to the substrate by spraying a catalyst ink onto the substrate in a desired pattern. The catalyst ink comprises any catalyst material suitable to produce a working electrode, and a solvent. In certain disclosed embodiments, the catalyst material is Pt on carbon. The wt % of the catalyst material, such as Pt on carbon, may be any wt % suitable to facilitate making a catalytic layer on the substrate, such as from greater than zero to 60 wt % or more catalyst material, preferably from 25 wt % to 55 wt %, from 35 wt % to 50 wt %, or from 40 wt % to 50 wt % catalyst material. In certain disclosed embodiments, the catalyst ink comprised a 46.6 wt % Pt on high surface area carbon (Trade name TEC10E50E, TANAKA). The solvent may be any solvent or mixture of solvents suitable to facilitate deposition of the catalyst material on the substrate. In some embodiments, the solvent is a water/alcohol mixture, such as a water/$C_{1-6}$alcohol. In certain embodiments, the alcohol is a $C_{1-4}$alcohol, such as methanol, ethanol, n-propyl alcohol, isopropyl alcohol, n-butanol, isobutanol, sec-butanol, tert-butanol or a combination thereof, preferably n-propyl alcohol. The catalyst ink may also comprise an ionomer suitable to facilitate production of a working electrode. In certain disclosed embodiments, the iononmer is a Nafion® ionomer, particularly D2020 Nafion® solution (a chemically stabilized perfluorosulfonic acid (PFSA)/polytetrafluoroethylene (PTFE) copolymer in the acid ($H^+$) form).

B. Non-Catalyst Filler Material

Figure 6:
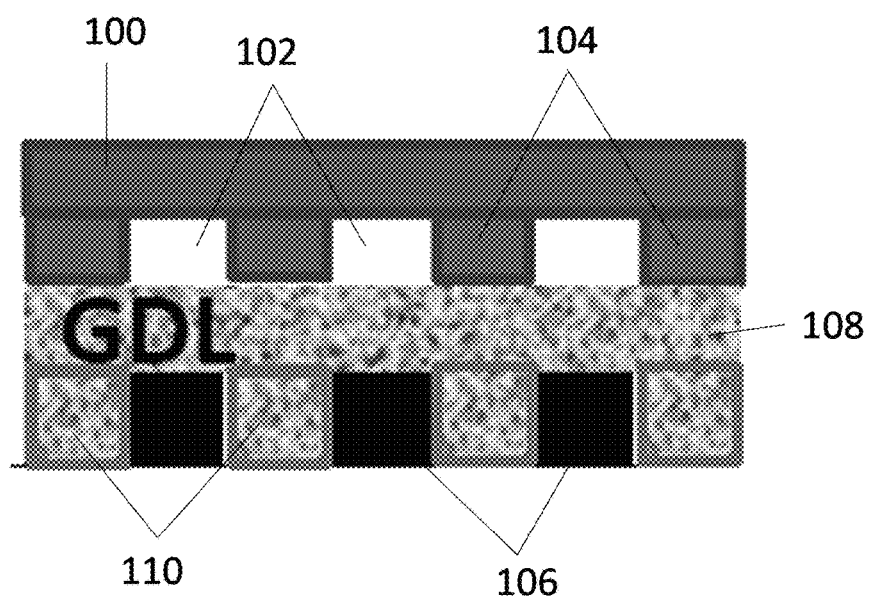
FIG. 6 is a schematic diagram illustrating a flow field and gas diffusion layer with the catalyst applied in the channels-only regions, and a carbon filler material applied in between the catalyst, i.e. corresponding to the lands-only regions.

The band of catalyst may be separated by segregating regions, such as areas of substrate where catalyst is not applied, such as in FIG. 1. However, in some embodiments, the segregating regions comprise non-catalyst material located in the gaps between the catalyst bands. FIG. 6 is a schematic diagram of a channels-only catalyst and associated flow field. With respect to FIG. 6, flow field 100 comprises channels 102 and walls 104. In FIG. 6, the catalyst material 106 is located on the substrate 108, such as a GDL, such that it corresponds to the channel regions 102 of the flow field 100. A non-catalyst filler or separating material 110 is located in between the catalyst bands, and corresponds to the walls or land regions 104 of the flow field 100. A person of ordinary skill in the art will appreciate that in a lands-only catalyst the situation is reversed, such that the catalyst is located in a pattern that corresponds to the walls of the flow field, and the non-catalyst material is located in a pattern corresponding to the channels.

The segregating, non-catalyst material may be any material suitable to facilitate fuel cell operation and/or to facilitate water removal from the catalyst active sites. In some embodiments, a carbon filler or a filler comprising a carbon/ionomer mixture used to separate the catalyst bands. The separating material may comprise a non-catalyst high surface area carbon, such as a carbon having a surface area of 500 $m^2$/gm to 1,000 $m^2$/gm or more, typically about 800 $m^2$/gm. The separating material may also comprise an ionomer, such as D2020 Nafion® (20% Nafion® in IPA solvent), Nafion® D520 (5% Nafion® in IPA solvent), or a short side chain ionomer, such as aquivion. In some embodiments the carbon and/or the ionomer are the same as the carbon support and/or ionomer used in the catalyst material.

The ionomer to carbon (I/C) ratio may be selected to provide a desired performance enhancement in a fuel cell. For example, a higher I/C ratio may be selected to improve performance at lower current densities, possible by improving the reaction kinetics. Whereas, a lower I/C ratio may be selected to improved performance at higher current densities, possibly by improving mass transport of the water. In some embodiments, the I/C ratio is from greater than zero to 1 or more, such as from 0.2 to 0.95, or from 0.5 to 0.9. In certain exemplary embodiments, the I/C ratio was 0.9, and in other exemplary embodiments the I/C ratio was 0.6.

In some embodiments, the separating material is applied to the substrate, such as a membrane, by any suitable technique, such as by spraying. An ink useful to apply the separating material by a spraying technique may comprise similar, or the same, components as the ink used to apply the catalyst layer, except that the carbon material does not include the catalyst. Certain embodiments comprise applying to a substrate a separating material ink comprising a high surface area carbon, such as Ketjen 300J high surface area carbon (800 $m^2$/gm); an ionomer solution, such as a solution of D2020 Nafion® (20% Nafion® in IPA solvent), Nafion® D520 (5% Nafion® in IPA solvent), or a short side chain ionomer, such as aquivion; water, such as DI water; and an alcohol, such as a $C_{1-4}$alcohol, typically methanol, ethanol, n-propyl alcohol, isopropyl alcohol, n-butanol, isobutanol, sec-butanol, tert-butanol, or a combination thereof, preferably n-propyl alcohol.

C. Method for Making the Patterned Catalyst

The catalyst/non-catalyst pattern may be produced by using one or more masks. In some embodiments, a mask protects either the walls 10 of the flow field (see FIG. 5), or the channel 12. In certain embodiments, two masks are used: one mask is selected to correspond to the flow field walls 10 and enables a material to be applied to the substrate in a pattern that corresponds to the flow field channels 12; and a second mask is selected that corresponds to the flow field channels 12 and enables a second material to be applied to the substrate in a pattern that corresponds to the flow field walls 10. In some embodiments, the catalyst is applied to the substrate in a pattern that corresponds to the flow field walls 10, referred to herein as "lands-only." Alternatively, the catalyst may be applied to the substrate in a pattern that corresponds to the flow field channels 12. Such embodiments are referred to herein as "channels-only." "Lands+½ c" refers to a "lands-only embodiment having half the amount of carbon.

The masks are made of any material suitable to form a mask that comprises slits that can be used to apply the inks and facilitate formation of the patterned electrode layer. Suitable mask materials include, but are not limited to, a fiberglass epoxy laminate sheet, a polymer laminate sheet, or a metal sheet comprising a metal that is suitable for use with catalyst and non-catalyst inks, such as stainless steel sheet. The sheet may have a thickness suitable to facilitate forming and using the mask, such as from greater than zero to 0.025", from 0.001" to 0.02", or from 0.005" to 0.1" thick. In some embodiments, the mask slits are made by a laser cutting through the mask sheet to form slits of a desired width and in a desired pattern, such as a channel pattern or a wall pattern. The slits in the mask correspond to the desired width of either the catalyst strips or the separating material strips, depending on the purpose of the mask. The catalyst and non-catalyst separating material may be applied in any order. In certain embodiments, the separating material is applied before the catalyst, and in other embodiments, the catalyst is applied before the separating material.

In some embodiments, applying a material using a mask may result in a small amount of the applied material seeping under the mask and into areas that were masked off. In such embodiments, the catalyst typically is applied to the substrate before the separating material to ensure that the catalyst's electrical contact with the substrate is not affected by non-catalyst material that seeped under the mask being between the applied catalyst and the substrate. In other embodiments, such as for a GDL substrate, the non-catalyst material may be applied first, followed by the catalyst, to ensure a proper membrane-catalyst contact when the MEA is assembled.

In alternative embodiments, the catalyst material is applied to the substrate, such as a decal, to form a substantially continuous layer. Catalyst material is then removed by a suitable technique, such as hot pressing, to leave the catalyst material on the substrate in a desired pattern. Non-catalyst filler material optionally may be added in between the catalyst material.

D. Multiple Catalyst Bands Per Channel

Figure 7:
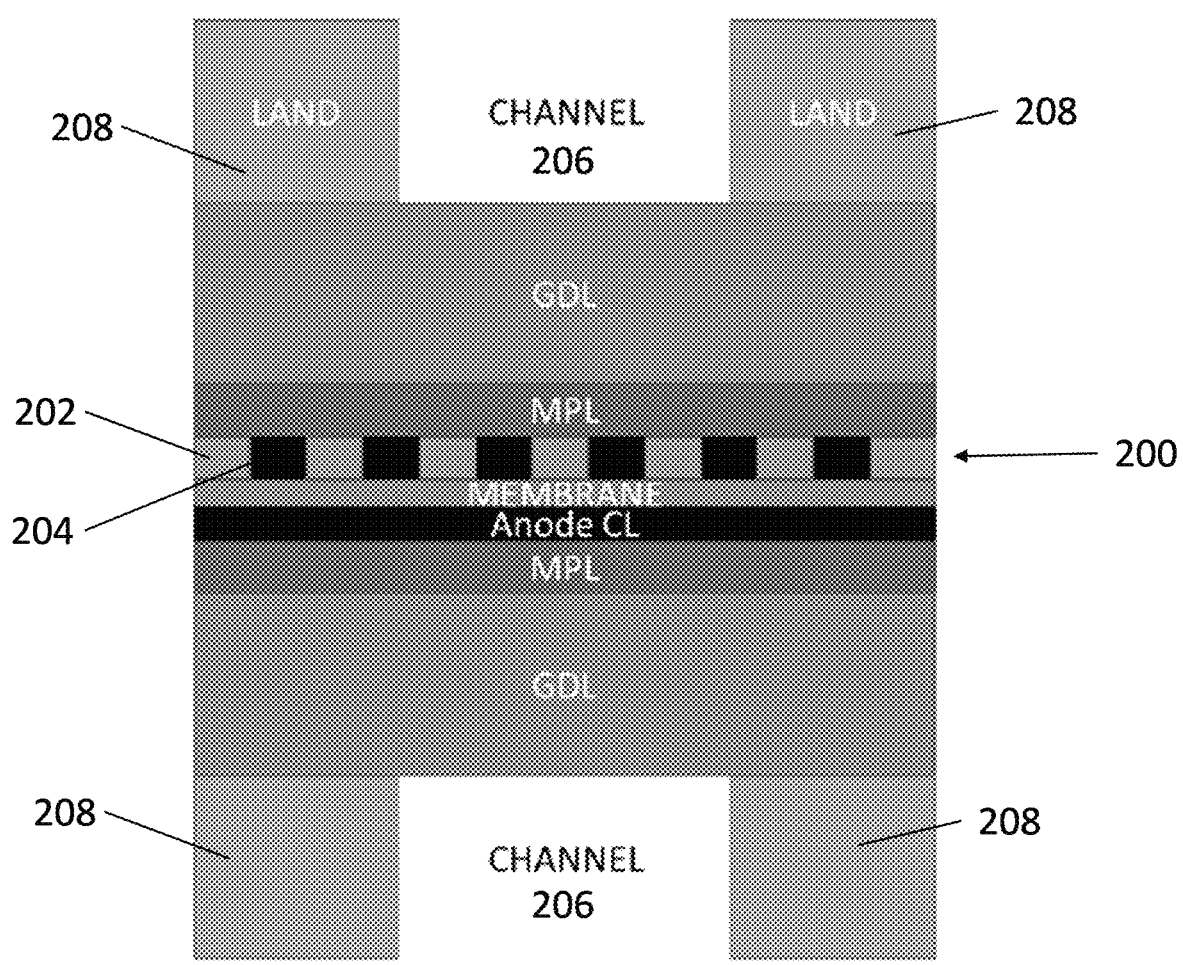
FIG. 7 is a schematic cross-sectional diagram of an exemplary embodiment of an MEA comprising multiple catalyst/non-catalyst bands within the flow field channel.
Figure 8:
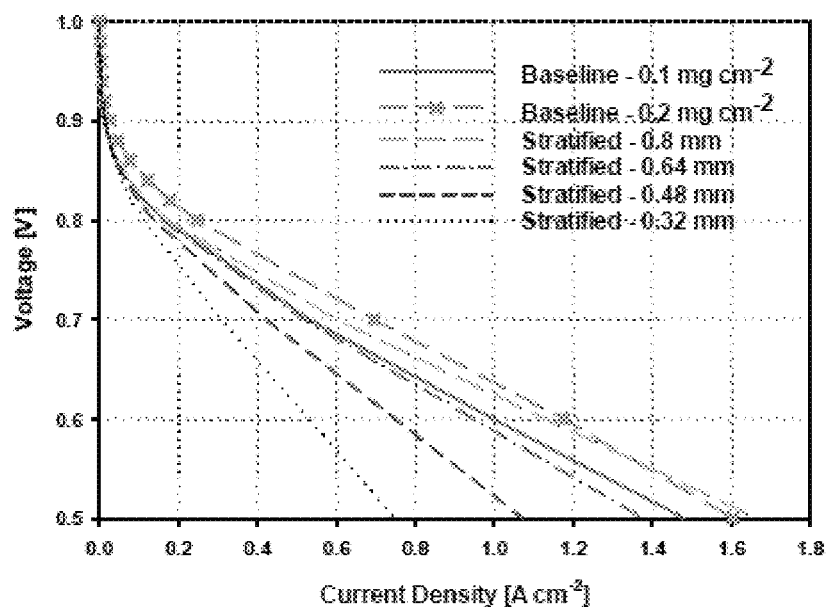
FIG. 8 is a calculated graph of voltage (V) versus current density (A/cm$^2$) for the MEA of FIG. 7, illustrating the expected benefit to performance with varying widths of the catalyst bands versus the channel width.
Figure 9:
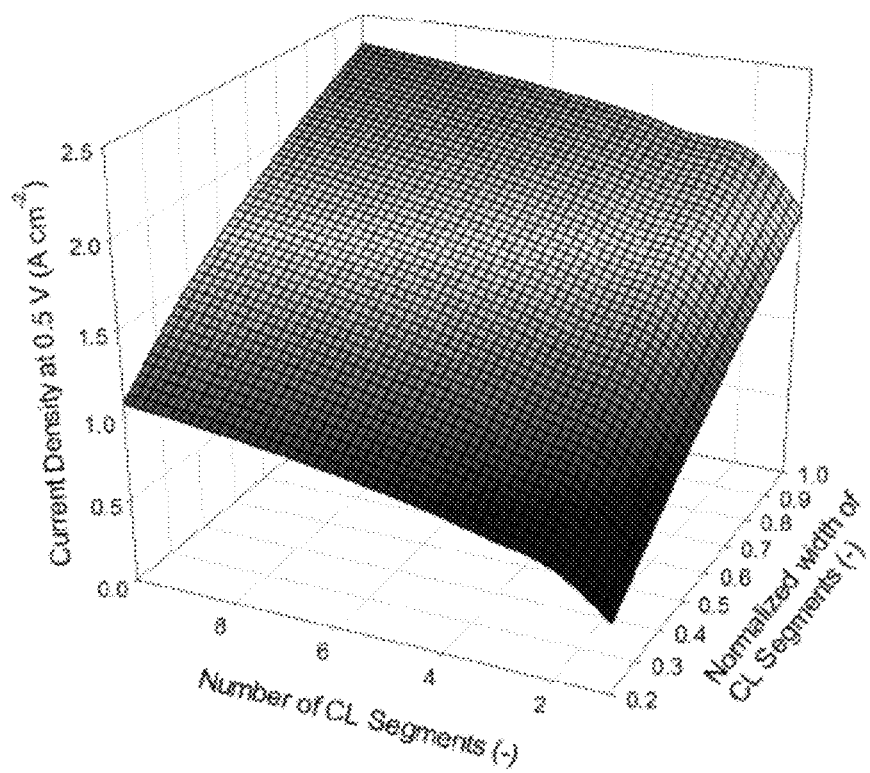
FIG. 9 is a graph of current density (A/cm$^2$) versus number of segments versus normalized width of the catalyst layer, illustrating how increasing the number of segments per channel width may improve the current density at 0.5 V.

In some embodiments, the catalyst bands are smaller than the width of a channel, such that multiple bands, such as 2, 3, 4, 5, 6, 7, 8, 9, 10 or more bands, of catalyst material and interspersing non-catalyst material are located under the channel region of a flow field. FIG. 7 is a schematic diagram illustrating one exemplary embodiment. With respect to FIG. 7, the cathode 200 comprises either regions of empty pores or non-catalyst filler material 202 on either side of catalyst material 204. Multiple bands of catalyst/non-catalyst material are located within the region of the flow field channel 206. In FIG. 7, the catalyst/non-catalyst pattern also extends under the flow field walls 208, but in other embodiments the catalyst is not continued under the walls. Embodiments with such multiple bands within the channel region may provide additional performance enhancement at higher current densities. FIGS. 8 and 9 show that the performance likely will increase by increasing the number of segments in the catalyst layer.

IV. Membrane Electrode Assembly

Also disclosed is a membrane electrode assembly comprising a disclosed patterned electrode as a cathode, an anode, and a membrane. The anode may or may not be patterned. Typically, the anodes are prepared with the same materials as the cathode, and in the same way, but without a mask, as the non-catalyst material is not required. For example disclosed MEAs where the catalyst is a Pt-based material, Pt loadings can vary from greater than zero to 0.5 $mg_{Pt}/cm^2$ or more, such as from 0.01 to 0.3 $mg_{Pt}/cm^2$, or from 0.025 to 0.2 $mg_{Pt}/cm^2$, and in certain disclosed embodiments the anode loading is 0.2 $mg_{Pt}/cm^2$. In certain exemplary embodiments, a high loading at the anode was used to only identify the relative improvement made by the cathode stratification, i.e. exclude any anode effects.

The anode and cathode electrodes are assembled by any technique suitable to form a membrane electrode assembly (MEA). A "baseline" MEA refers to an MEA that does not comprise a patterned electrode. In some embodiments, the anode and cathode electrodes, such as gas diffusion electrodes (GDEs), are hot pressed to a membrane, such as a Nafion® NR211 membrane, at a temperature and force suitable to form the MEA. Nafion® NR211 is a 25 micron membrane available from Chemours. Other membranes are available, including Chemours XL, Chemours HP, and other membranes from other vendors including W. L. Gore. The temperature may be from 100° C. or less to 200° C. or more, such as from 110° C. to 180° C., from 120° C. to 160° C. or from 130° C. to 150° C. The force applied may be from 1,000 lbsf or less to 2,000 lbsf or more, such as from 1,250 lbsf to 1,750 lbsf, or from 1,500 lbsf to 1,700 lbsf. The electrodes may be exposed to the temperature and/or force for a time suitable to form the MEA, such as from greater than zero to 30 minutes or more, such as from 2 minutes to 20 minutes, or from 5 minutes to 15 minutes, and in certain embodiments, about 10 minutes. The hot press temperature is then set to cool, for example, to a temperature of about 100° C. or less, such as to a temperature of from 100° C. to 80° C., or from 95° C. to 90° C. Suitable gaskets, such as 1 millimeter thick PTFE sub gaskets, are placed on either side of the membrane during hot pressing to define a desired active area. In certain embodiments, the active area is from 20 $cm^2$ to 100 $cm^2$ or more, such as from 30 $cm^2$ to 75 $cm^2$, or about 50 $cm^2$. After hot pressing, the MEA is placed in Fuel Cell Technology (FCT) hardware with suitable gaskets, such as polyurethane gaskets, and tightened to a suitable torque, to form the fuel cell, such as from greater than zero to 100 in-lb or more, from 20 in-lb to 75 in-lb, from 40 in-lb to 60 in-lb, or from 50 in-lb to 55 in-lb, and in certain embodiments, about 52 in-lb. The MEA is then conditioned under standard conditioning conditions.

V. Results

A. Catalyst Bands with No Filler

MEAs comprising the disclosed patterned cathode electrode perform better than MEAs comprising non-patterned, traditional electrodes, especially at higher current densities, such as current densities above 1.4 amps/$cm^2$, such as from 1.4 amps/$cm^2$ to 3 amps/$cm^2$ or more, from 1.4 amps/$cm^2$ to 2.5 amps/$cm^2$, or from 1.45 amps/$cm^2$ to 1.6 amps/$cm^2$. This compares with typical, lower current densities of up to 1.2 amps/$cm^2$. Without being bound to a particular theory, at higher current densities, such as above 0.65 volts, the performance of an MEA may be mass transfer limited, i.e., limited by the transfer of water from the catalyst active sites. At high current densities, water is produced at the electrode more rapidly, and transfer away from the electrode becomes limiting. The disclosed patterned electrode enables water transport away from the catalyst active sites, thereby enhancing the performance of the MEA. In some embodiments, the mass transport of water is enhanced by 15% or more, such as by at least 20%, or by from 20% to 100%.

Figure 10:
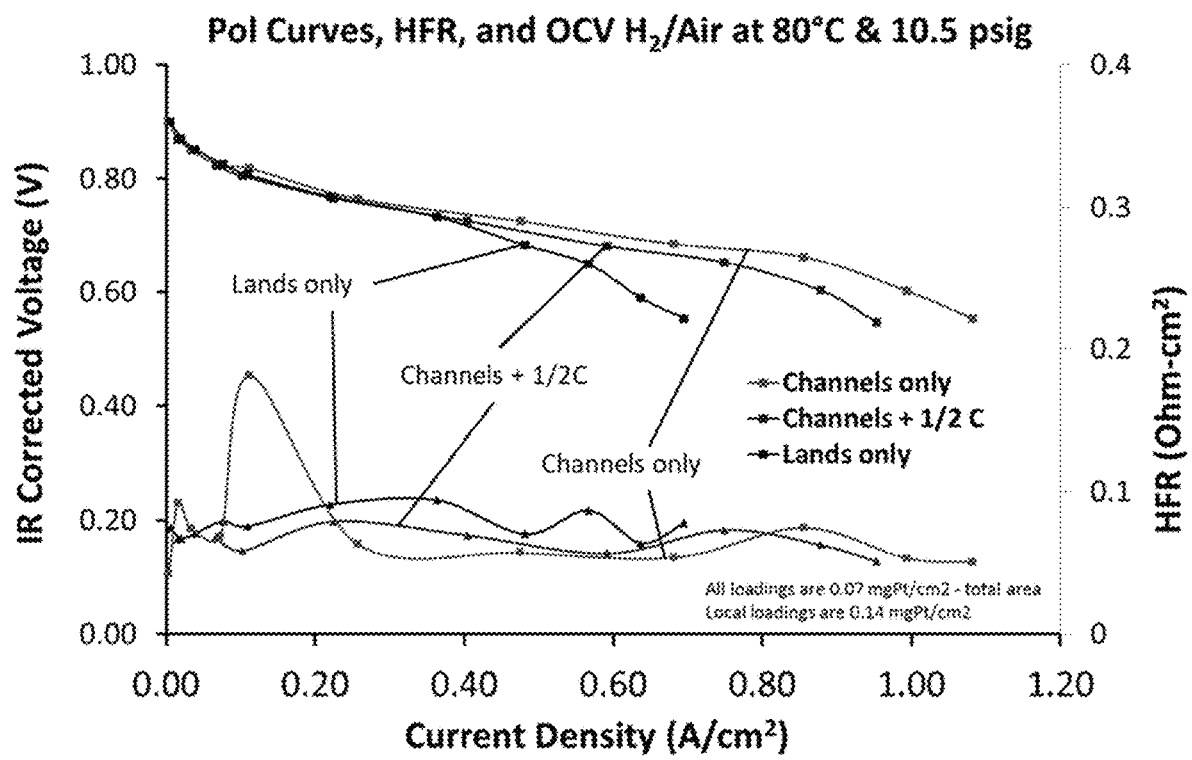
FIG. 10 is a graph of voltage (V) and HFR (Ohm-cm$^2$) versus current density (A/cm$^2$), illustrating the polarization curves, open current voltages and HFR of various MEAs at different current densities.

FIG. 10 provides a comparison of MEAs comprising different patterned electrodes: "lands-only," where the catalyst is located under the flow field walls; "channels-only," where the catalyst is located under the flow field channels; and "lands +½c," where the catalyst is located under the flow field walls and there is a carbon filler in between the lines of catalyst, i.e. under the flow field channels. All loadings are at 0.07 $mg_{Pt}/cm^2$ total area, and local loadings are 0.14 $mg_{Pt}/cm^2$. FIG. 10 shows that for an MEA operating in $H_2$/air at 80° C. and 10.5 psig, the "channels-only" catalyst is most effective as the current density increases, and the "lands-only" catalyst has the lowest performance.

Figure 11:
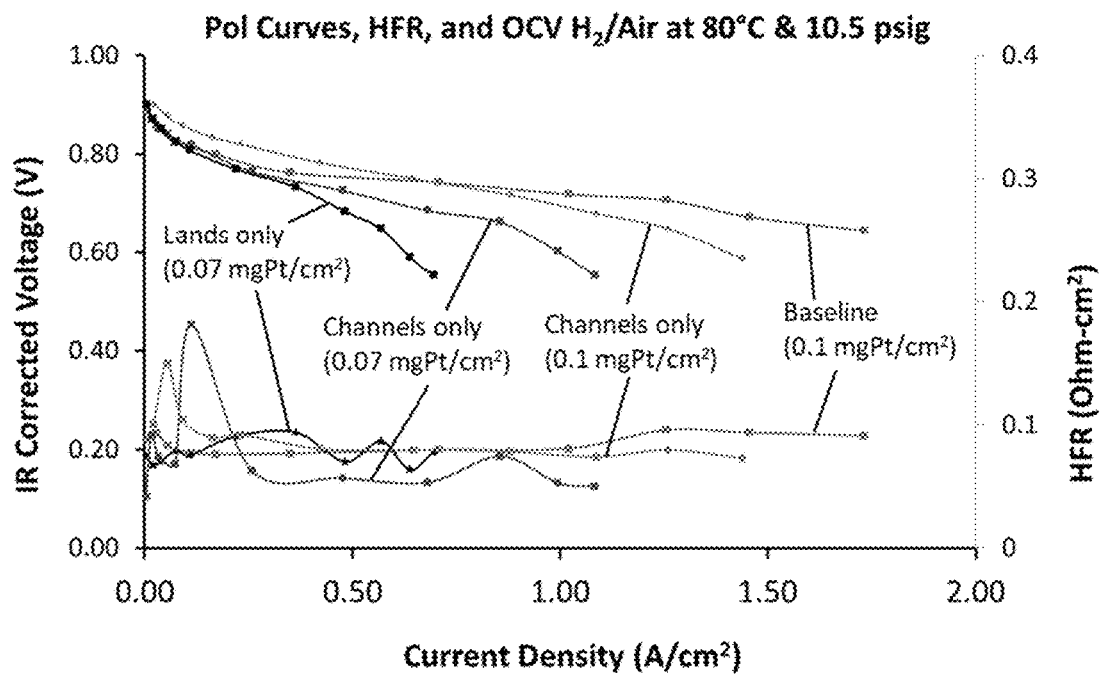
FIG. 11 is a graph of voltage (V) and HFR (Ohm-cm$^2$) versus current density (A/cm$^2$), illustrating the polarization curves, open current voltages and HFR of various MEAs at different current densities, compared to a baseline MEA that does not include a patterned catalyst.

FIG. 11 compares an MEA comprising non-patterned catalysts with MEAs comprising patterned lands-only or channels-only catalysts. FIG. 11 shows that channels-only performed best in these tests but did not achieve the performance of the baseline MEA. However, the transport of water did improve compared to the MEA with a channels-only catalyst having a similar Pt loading as the baseline, and with a lands-only catalyst having a lower Pt loading than the baseline (FIG. 12).

Figures 12, 13:
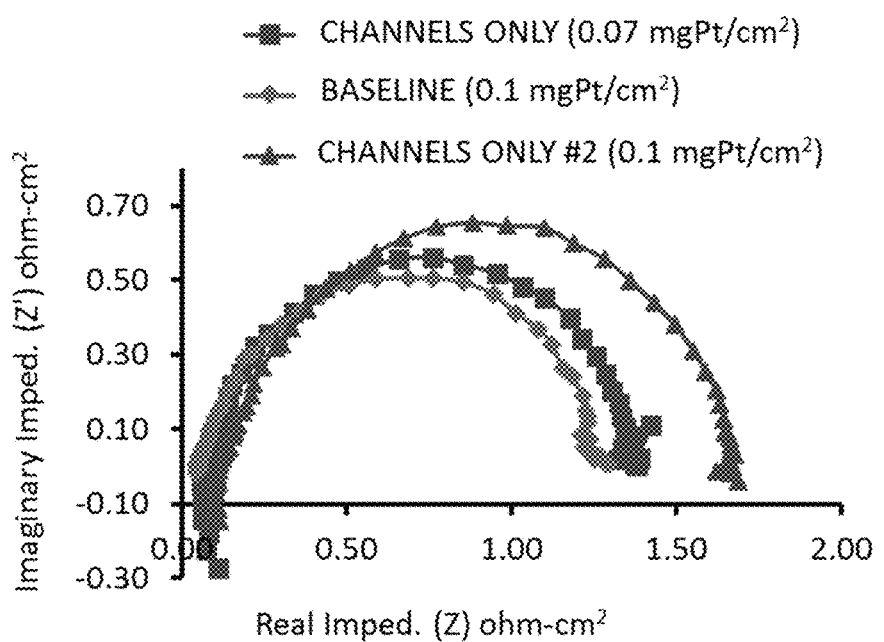
FIG. 12 is a table providing the X-ray fluorescence (XRF) loading, electrochemical surface active area (ECSA) desorption peak and mass transfer activity for various MEAs.
FIG. 13 is a graph of imaginary versus real impedance for an H$_2$/air MEA at 1 amp (0.2 (anode)/0.1 cathode) mg$_{Pt}$/cm$^2$), illustrating the lower impedance of the baseline than of two lands-only MEAs at lower current densities.
Figure 14:
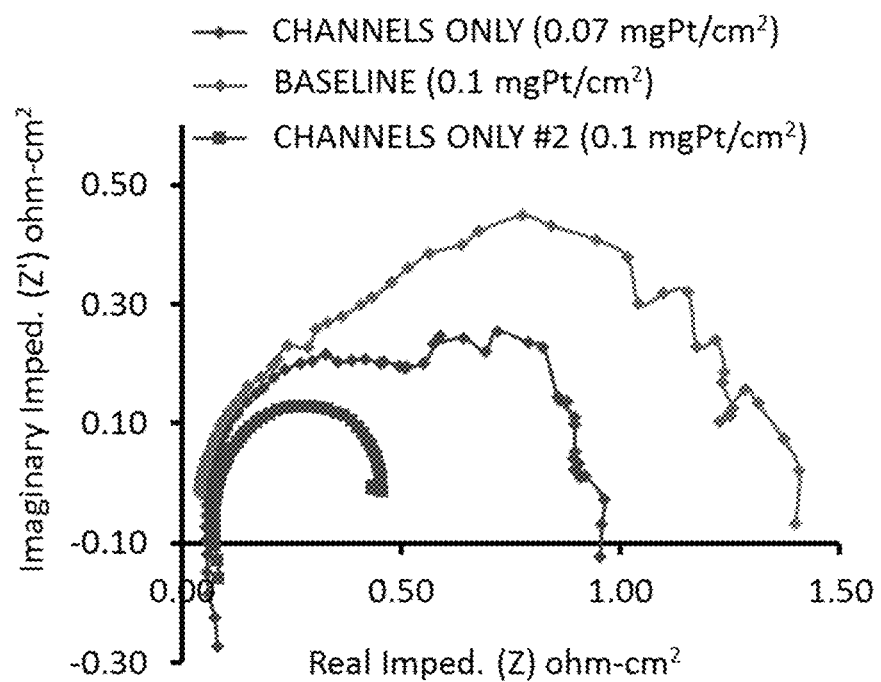
FIG. 14 is a graph of imaginary versus real impedance for an H$_2$/air MEA at 80 amps (0.2/0.1 mg$_{Pt}$/cm$^2$), illustrating the higher resistance of two lands-only MEAs compared to baseline at a high current density.

The channels-only MEAs without a non-catalyst filler between the bands of catalyst demonstrated higher resistance at higher current densities (FIGS. 13 and 14). This was consistent with the polarization curves (FIG. 11).

Figure 15:
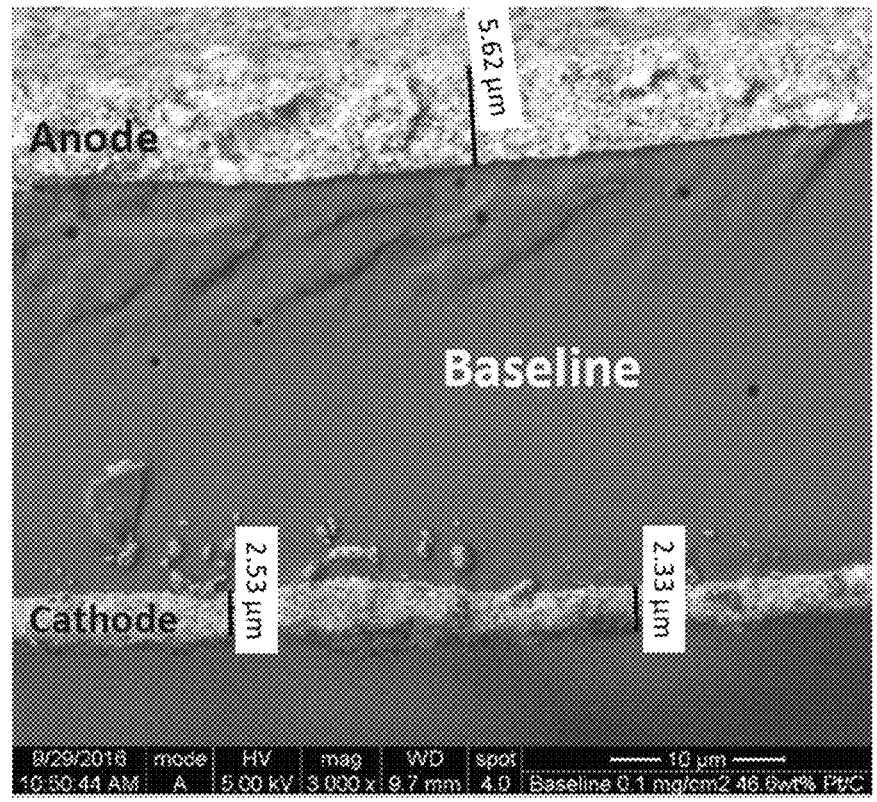
FIG. 15 is an SEM image of a baseline MEA that does not include a patterned catalyst.
Figure 16:
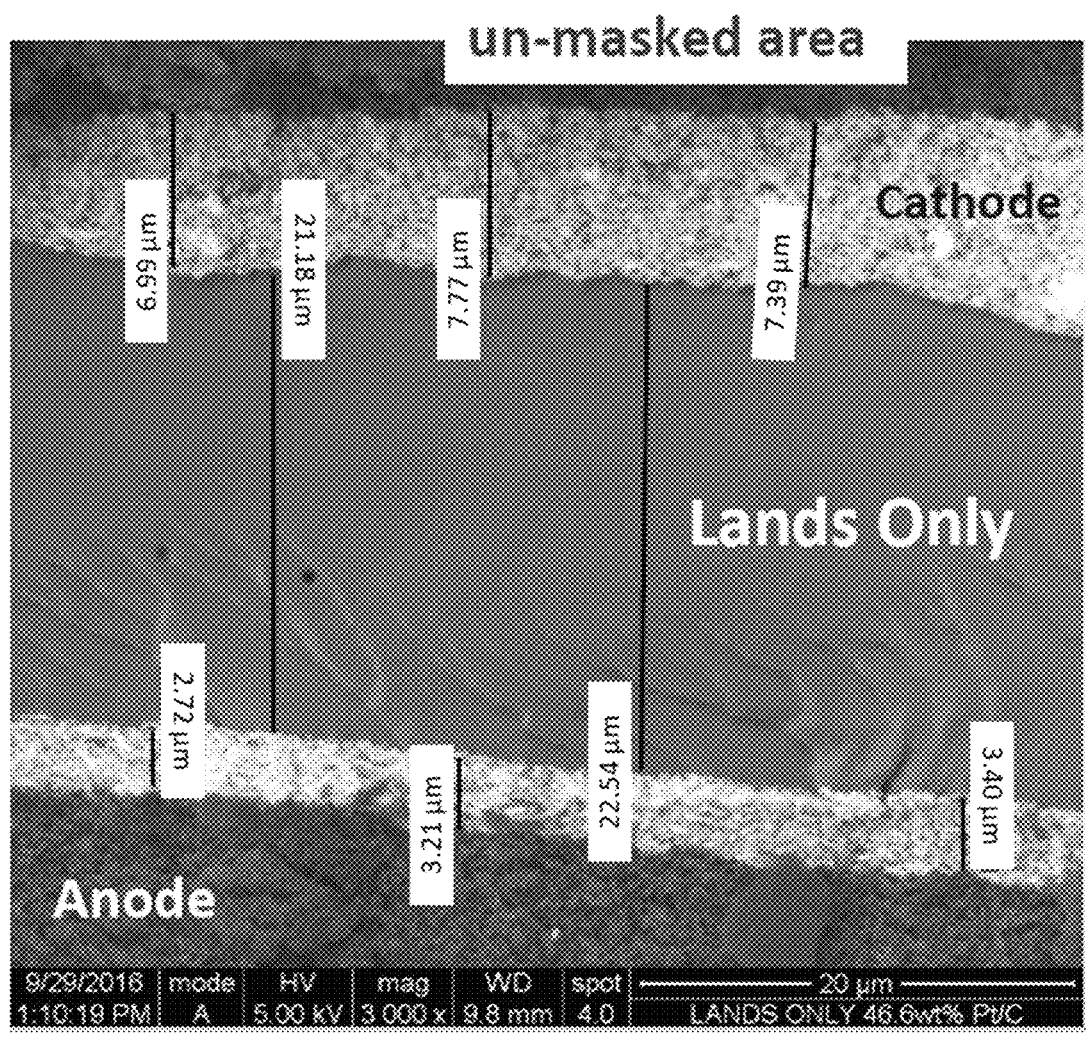
FIG. 16 is an SEM image of an un-masked area of a channels-only MEA illustrating the deposition of the cathode catalyst in the un-masked area.
Figure 17:
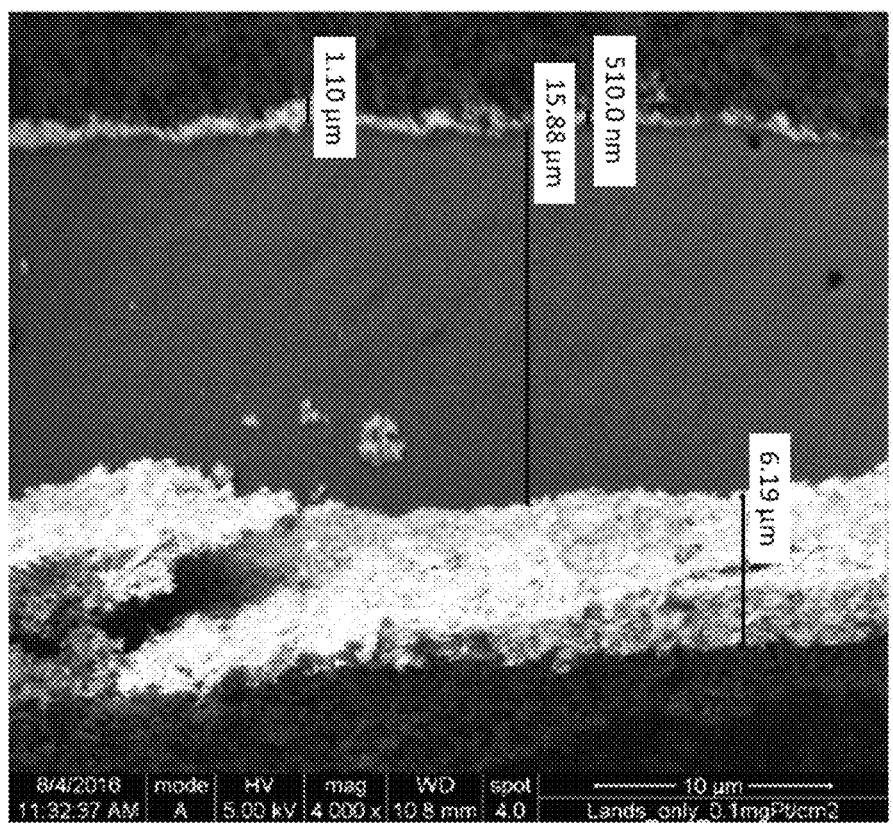
FIG. 17 is an SEM image of a masked area of a channels-only MEA, illustrating Pt seepage under the masked off region, resulting in a thin band of Pt on the masked off region of the cathode.
Figure 18:
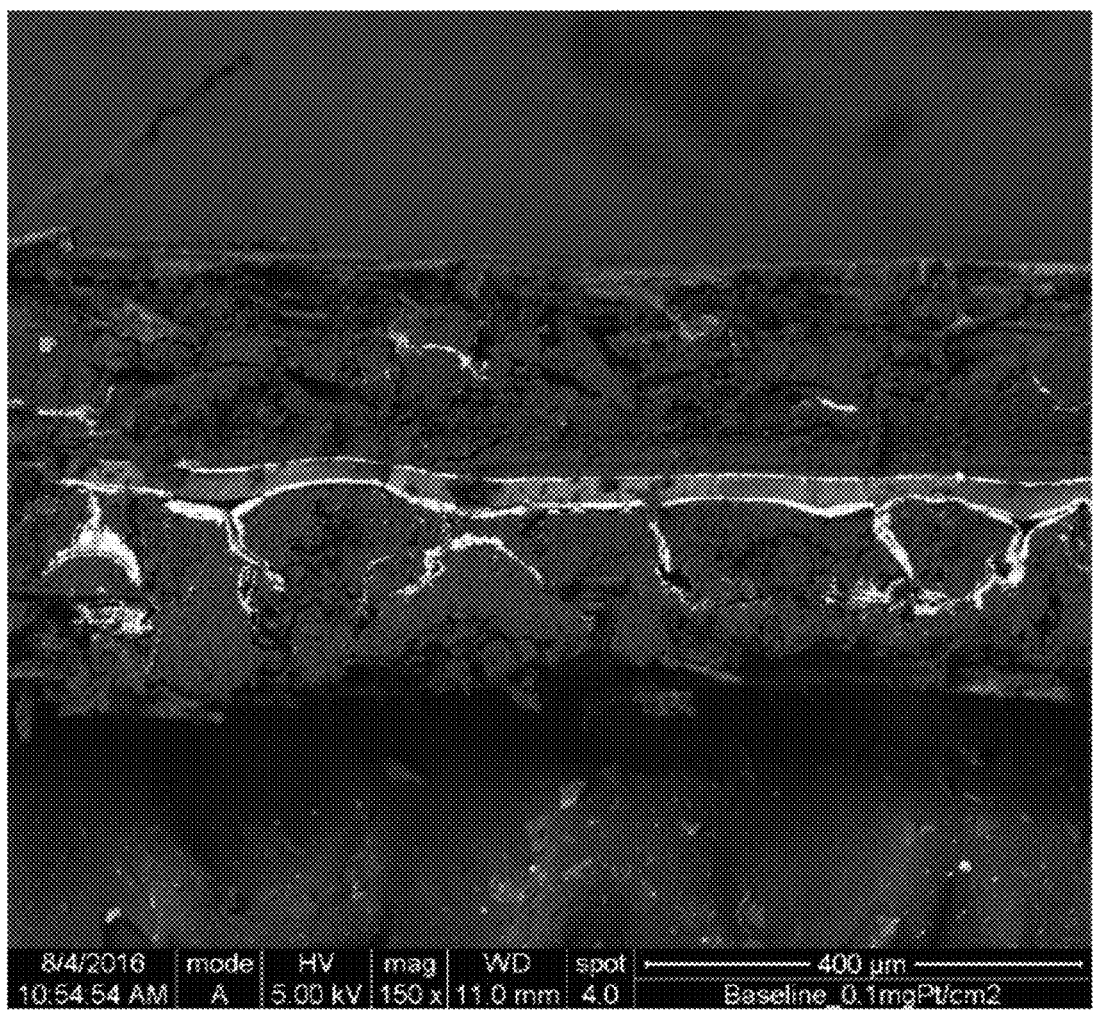
FIG. 18 is an SEM image of a baseline MEA illustrating that the Pt ink can penetrate into cracks in a GDL during spraying.

SEM images of a baseline MEA and a non-masked region of a channelss-only MEA show the deposition of the cathode catalyst (FIGS. 15 and 16). However, in a masked off region of the channels-only catalyst, a small amount of the catalyst can be seen at the cathode, indicating that the Pt ink seeped under the mask during application (FIG. 17). And FIG. 18 illustrates that the Pt ink penetrates into cracks in a substrate, such as a gas diffusion layer (GDL).

B. Catalyst Bands with Non-Catalyst Filler

Figure 19:
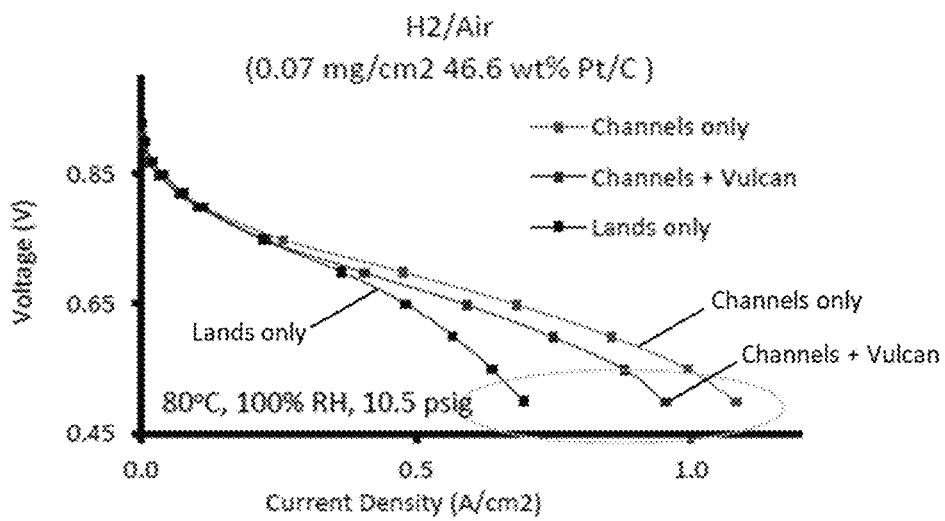
FIG. 19 is a graph of voltage (V) versus current density (A/cm$^2$), illustrating that channels-only electrode comprising a catalyst patterned to be only under the channels and a non-catalyst filler material applied in between the catalyst bands, performed better than the lands-only electrode that comprised catalyst bands under the lands areas.
Figure 20:
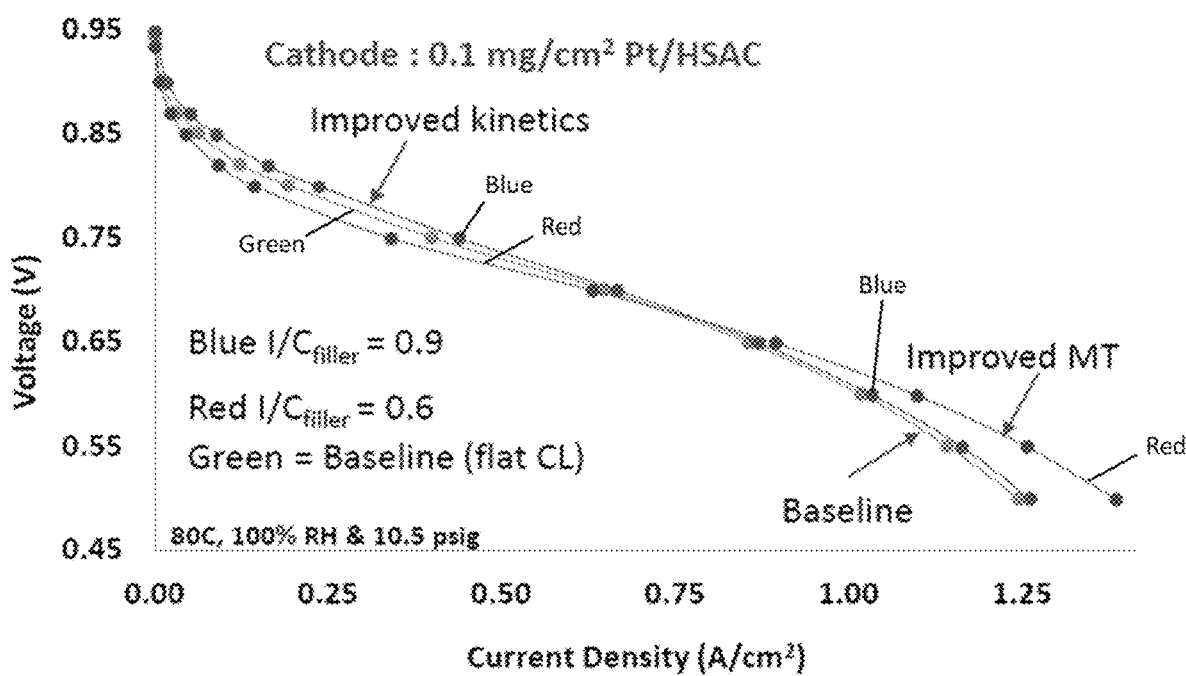
FIG. 20 is a graph of voltage (V) versus current density (A/cm$^2$), illustrating the improved results of an electrode having catalyst bands with non-catalyst filler material applied in between the catalyst bands, compared to a baseline MEA.

A patterned catalyst layer comprising non-catalyst filler material separating bands of catalyst provided improved results compared to a baseline MEA without a patterned catalyst electrode. In contrast to results obtained using a catalyst without a filler material (FIG. 11) where the baseline MEA gave the best performance and the lands-only catalyst gave the worst results, FIG. 19 clearly indicates that channels-only catalysts with a filler material perform better than a lands-only catalyst with a filler material. And FIG. 20 shows that a channels-only catalyst comprising the filler material in between the catalyst bands performs better than the baseline at higher current densities, such as a current density above 0.75 amp/cm$^2$. Furthermore, a carbon filler material with an I/C ratio of 0.6 had improved mass transport at higher current densities, than a filler with an I/C ratio of 0.9. However, at lower current densities, where kinetics may be limiting rather than mass transport, the filler material with an I/C of 0.9 showed an improvement over both the baseline and the I/C 0.6 filler material. Without being bound to a particular theory, the mass transport improvement of the low I/C ratio may be due to reduced water/ionomer retention, whereas the kinetic improvement at high I/C ratio suggests higher Pt utilization.

A primary cost factor of a fuel cell is the cost of the catalyst. The improved performance of the disclosed patterned catalysts comprising the non-catalyst filler material enables fuel cell systems for use in applications requiring high current densities to be manufactured at a reduced cost. Such applications include, but are not limited to, clean energy automotive and stationary power applications.

VI. Examples

Example 1

Materials and Methods

Patterned catalyst layer fabrication is performed using masks during spray coating to create a patterned electrode on a gas diffusion layer (GDL) with varying thickness. A catalyst electrode layer deposited onto a GDL is generally referred to as a Gas Diffusion Electrode (GDE). However, patterned electrode layers have also been made by depositing the electrode layer directly onto a polymer electrolyte membrane known as catalyst coated membranes (CCMs). The initial mask was made by laser cutting 0.8 mm wide strips in a 0.010" fiberglass epoxy laminate sheet. The mask dimensions mirror the bipolar plate flow-field at the cathode, exposing either the land or channel regions, thus depositing catalyst under the 'land-only' or the 'channel-only'. In a second iteration, the mask had 0.4 mm wide slits that were etched in a 0.005" thick 316 stainless steel, full hard temper foil. The flow-field used for this was 50 cm$^2$ Fuel Cell Technology, quad serpentine. Other flow fields, such as straight high aspect ratio flow-fields can be used.

The catalytic layer is formed by applying a patterned carbon (non-catalyzed filler carbon) layer followed by a Pt-catalyzed carbon layer in the void regions where the filler-carbon was not applied. The catalyst ink recipe includes 46.6 wt % Pt on high surface area carbon (Trade name TEC10E50E, TANAKA), D2020 Nafion® solution, DI water and n-propyl alcohol (NPA). Other carbon supported catalysts available from other suppliers can also be used in this method. The non-catalyst carbon material was made of Ketjen 300J high surface area carbon (800 m$^2$/gm), D2020 Nafion® solution, DI water and NPA. Other carbon materials available with different surface areas from different suppliers can also be used in this method. The ionomer to carbon (I/C) ratios used were 0.9 and 0.6. Other I/C ratios can be used as well. After deposition of the high-surface area carbon (not-catalyzed with platinum), the void areas covered by the land (or channel) mask were filled by deposition of an active catalyst electrode layer with the channel (or land) mask. The overall Pt loading at the cathode for these measurements was 0.1 mg$_{Pt}$/cm$^2$. (The cathode loading can vary from 0.025 to 0.4 mg/cm$^2$). Freshly prepared catalytic ink was sonicated for 10 seconds with an ultrasonic probe, followed by a 20 minute sonication ice bath. A 25 kHz ultrasonic nozzle by Sono-Tek was used to spray catalyst ink on 57 cm$^2$ 29 BC SGL GDLs, creating gas diffusion electrodes (GDEs). Other GDLs with different thicknesses, different microporous layers or different porosity can also be used. The GDLs were placed on a 100° C. hot plate to ensure immediate drying of deposited layers before spraying the next layer. The GDLs are held in place with vacuum suction of the hot plate as well as with the respective mask used to create the desired catalyst layer pattern. When spraying non-catalyst carbon (filler carbon) in areas adjacent to the catalyzed areas, the carbon filler is sprayed first in order to ensure proper connection between the catalyst and the membrane.

Anodes are sprayed with the same materials and in the same way, but without a mask. The anode Pt loading is 0.2 mg$_{Pt}$/cm$^2$. Loadings can vary from 0.025 to 0.2 mgPt/cm$^2$. A high loading was used to identify the relative improvement made by the cathode stratification.

The quality, thickness and porosity of the catalyst layers is verified by Scanning Electron Microscopy using a Phillips XL30 ESEM, and a Micrometrics Auto Pore IV Porosimeter. All Pt loadings were measured by XRF (X-Ray Fluorescence).

Assembly

The anode and cathode GDEs were hot pressed to a Nafion® NR211 membrane at 140° C. with a force of 1650 lbs for 10 minutes. (Nafion® NR211 is a 25 micron membrane available from Chemours. Other membranes are available, including Chemours XL, Chemours HP, plus other vendors including W. L. Gore). Then the hot press temperature was set to cool to 93° C. 1 millimeter thick PTFE sub gaskets were placed on either side of the membrane during hot pressing to define an active area of 50 cm$^2$. After hot pressing, the MEA was placed in 50 cm$^2$ Fuel Cell Technology (FCT) hardware with 12.5 millimeter polyurethane gaskets and tightened to 50 in-lb.

Conditioning

Once attached to a FCT test station, the MEA was heated to 80° C., the back pressure is set to 150 kPa and the anode and cathode gas flow rates are set to 1394/3319 sccm of H$_2$/Air, respectively. MEA conditioning was done with the voltage cycling regime that included 20 V-cycles performed at 100% relative humidity (RH), 5 V-cycles at 32% RH, two 2 hour holds at 0.6 V followed by two 2 hour oversaturated low temperature soaks at 30° C. in H$_2$/N$_2$.

Performance Characterization

Fuel cell performance characterization was done by collecting polarization curves in H$_2$/Air at 80° C., 150 kPa and 270 kPa for 100% RH and 40% RH. A polarization curve and mass activity were measured in H$_2$/O$_2$ at 80° C. and 150 kPa and 100% RH. Electrochemical surface area and H$_2$ crossover were measured at 10.5 kPa, 100% RH for 30° C. and 80° C. Electrochemical impedance spectroscopy data was measured at 1 A, 2 A, 3 A, 4 A, 5 A, 10 A, 20 A, 50 A, 70 A and 80 A at 80° C., 10.5 psig and 100% RH.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An electrode, comprising:
   a flow field comprising a flow field channel that is defined by flow field walls;
   a substrate layer in direct physical contact with the flow field; and
   a plurality of catalyst regions separated by non-catalyst regions and in direct physical contact with the substrate layer, the plurality of catalyst regions being located such that multiple catalyst regions and multiple non-catalyst regions are arranged under the flow field channel, the catalyst regions comprising a catalyst material;
   wherein the plurality of catalyst regions are located under the flow field channel and the flow field walls.

2. The electrode of claim 1, wherein the non-catalyst regions are empty regions.

3. The electrode of claim 1, wherein the catalyst material comprises platinum and a carbon support.

4. The electrode of claim 3, wherein the carbon support is a high surface area carbon support.

5. The electrode of claim 1, wherein the non-catalyst regions comprise non-catalyst material comprising carbon, an ionomer, or a combination thereof.

6. The electrode of claim 1, wherein:
   the catalyst regions each have a first width of from greater than zero to 2 mm;
   the non-catalyst regions each have a second width of from greater than zero to 2 mm;
   or a combination thereof.

7. A membrane electrode assembly, comprising
   a cathode comprising the electrode of claim 1;
   an anode; and
   a membrane.

8. A fuel cell, comprising the electrode of claim 1.

9. A stationary power device comprising the electrode of claim 1.

10. The electrode of claim 1, wherein the substrate layer comprises a gas dispersion layer and a microporous layer, and the flow field directly contact the gas dispersion layer and the plurality of catalyst regions directly contact the microporous layer.

11. An electrode, comprising:
    a flow field comprising a flow field channel that is defined by flow field walls;
    a substrate layer in direct physical contact with the flow field; and
    a plurality of catalyst regions separated by non-catalyst regions and in direct physical contact with the substrate layer, the plurality of catalyst regions being located such that multiple catalyst regions and multiple non-catalyst regions are arranged under the flow field channel, the catalyst regions comprising a catalyst material;
    wherein the plurality of catalyst regions are located under the flow field channel, but not under the flow field walls.

12. The electrode of claim 11, wherein the catalyst material comprises platinum and a carbon support.

13. The electrode of claim 12, wherein the carbon support is a high surface area carbon support.

14. The electrode of claim 11, wherein the non-catalyst regions comprise non-catalyst material comprising carbon, an ionomer, or a combination thereof.

15. The electrode of claim 11, wherein the non-catalyst regions are empty regions.

16. The electrode of claim 11, wherein the substrate layer comprises a gas dispersion layer and a microporous layer, and the flow field directly contact the gas dispersion layer and the plurality of catalyst regions directly contact the microporous layer.

17. The electrode of claim 11, wherein:
    the catalyst regions each have a first width of from greater than zero to 2 mm;
    the non-catalyst regions each have a second width of from greater than zero to 2 mm;
    or a combination thereof.

18. A membrane electrode assembly, comprising
    a cathode comprising the electrode of claim 11;
    an anode; and
    a membrane.

19. A fuel cell, comprising the electrode of claim 11.

20. A stationary power device comprising the electrode of claim 11.

* * * * *